(12) United States Patent
Schuster et al.

(10) Patent No.: US 6,970,651 B1
(45) Date of Patent: Nov. 29, 2005

(54) HIGH-SENSITIVITY TRACKING IN FREE-SPACE OPTICAL COMMUNICATION SYSTEMS

(75) Inventors: John J. Schuster, Bellevue, WA (US); John A. Bell, Issaquah, WA (US)

(73) Assignee: Terabeam Corporation, Falls Church, VA (US)

( * ) Notice: Subject to any disclaimer, the term of this patent is extended or adjusted under 35 U.S.C. 154(b) by 711 days.

(21) Appl. No.: 09/919,687

(22) Filed: Jul. 31, 2001

(51) Int. Cl.$^7$ .............................................. H04B 10/00
(52) U.S. Cl. ...................... 398/131; 398/120; 398/118
(58) Field of Search ....................... 398/118, 119, 120, 398/128, 129, 130, 131

(56) References Cited

U.S. PATENT DOCUMENTS

| | | | |
|---|---|---|---|
| 3,875,400 A * | 4/1975 | Pao et al. .................... | 398/131 |
| 4,633,315 A | 12/1986 | Kasperkovitz | |
| 4,823,170 A | 4/1989 | Hansen | |
| 5,062,150 A | 10/1991 | Swanson et al. | |
| 5,539,557 A | 7/1996 | Horiuchi et al. | |
| 5,574,479 A | 11/1996 | Odell | |
| 5,684,614 A * | 11/1997 | Degura ........................ | 398/131 |
| 5,710,652 A | 1/1998 | Bloom et al. | |
| 5,777,768 A | 7/1998 | Korevaar | |
| 5,786,923 A | 7/1998 | Doucet et al. | |
| 5,790,291 A | 8/1998 | Britz | |
| 6,025,948 A | 2/2000 | Gautheron | |
| 6,031,648 A * | 2/2000 | Javitt et al. ................... | 398/32 |
| 6,091,528 A | 7/2000 | Kanda | |
| 6,097,522 A | 8/2000 | Maerki et al. | |
| 6,219,133 B1 | 4/2001 | Kawase et al. | |
| 6,271,953 B1 | 8/2001 | Dishman et al. | |
| 6,504,634 B1 * | 1/2003 | Chan et al. ................. | 398/129 |

* cited by examiner

*Primary Examiner*—Jason Chan
*Assistant Examiner*—Nathan Curs
(74) *Attorney, Agent, or Firm*—Blakely Sokoloff Taylor & Zafman LLP

(57) ABSTRACT

Apparatus and methods for implementing a high-power or high-sensitivity tracking mode of operation in a free-space optical communication system are disclosed. Functions of the high-power or high-sensitivity tracking mode may be implemented in response to one or more engage signals generated and transmitted in response to a sensed inclement weather condition, such as fog or the like, which may interfere with communication of an optical signal between a pair of free-space optical terminals in the free-space optical communication system. Implementation of the high-power or high-sensitivity tracking mode facilitates maintenance of the alignment between the pair of free-space optical terminals throughout the duration of the inclement weather condition to allow data communication to resume fully after the inclement weather condition has diminished.

34 Claims, 4 Drawing Sheets

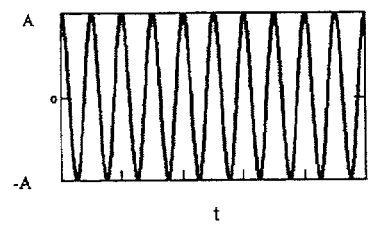
FIG. 2A
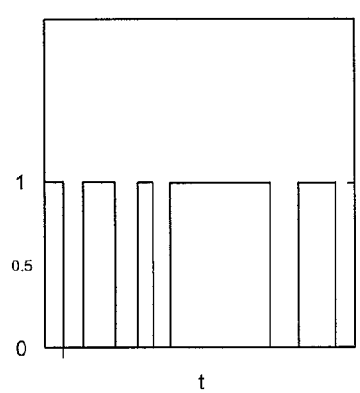 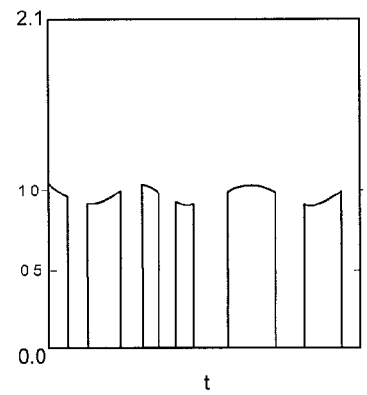
FIG. 2B      FIG. 2C
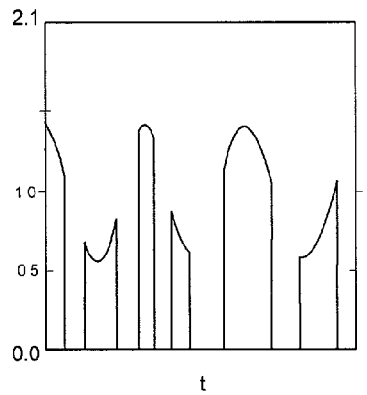 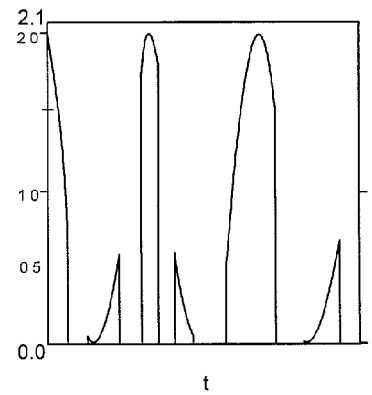
FIG. 2D      FIG. 2E

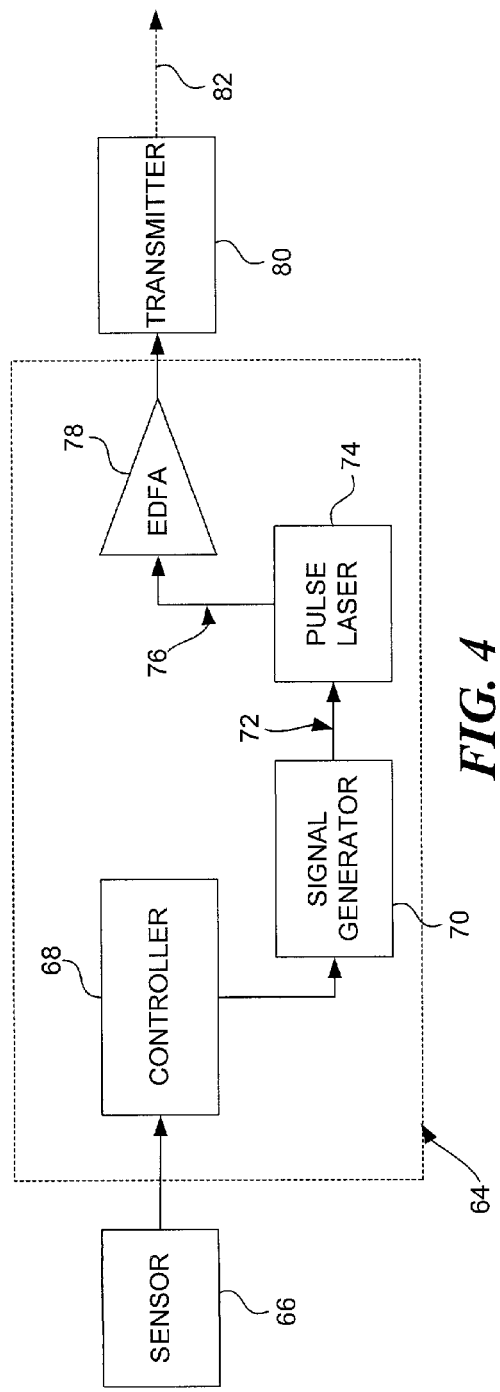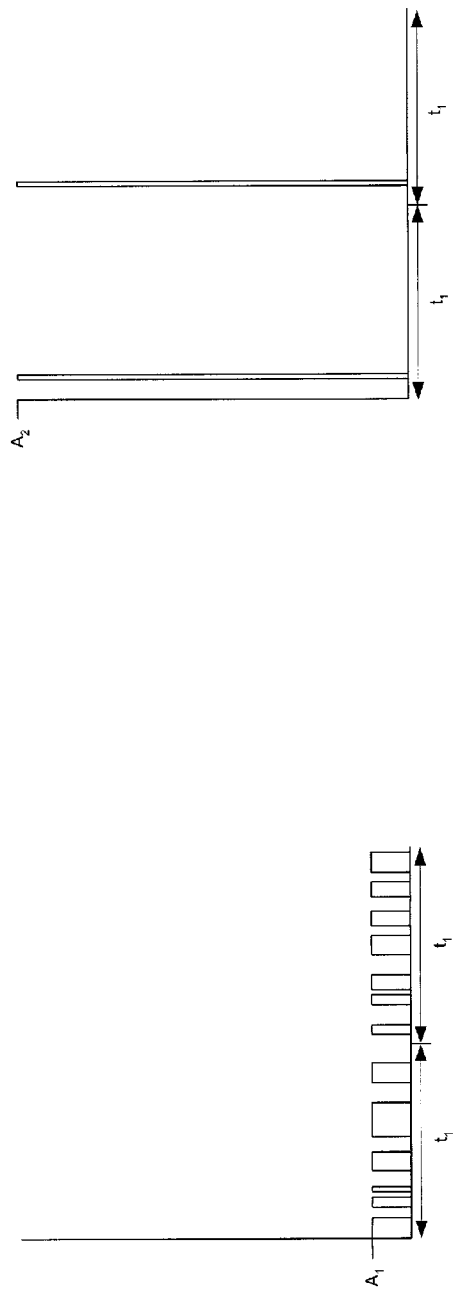

HIGH-SENSITIVITY TRACKING IN FREE-SPACE OPTICAL COMMUNICATION SYSTEMS

TECHNICAL FIELD OF THE INVENTION

This disclosure relates generally to free-space optical communication systems, and more particularly, but not exclusively, to apparatus and methods for implementing a high-power or high-sensitivity tracking mode of operation during inclement weather conditions to maintain alignment between two free-space optical terminals.

BACKGROUND INFORMATION

With the increasing popularity of wide area networks, such as the Internet or the World Wide Web, network growth and traffic have exploded in recent years. Network users continue to demand faster networks, and as network demands continue to increase, existing network infrastructures and technologies are reaching their limits.

An alternative to existing hardwire or fiber network solutions, which suffer from limited capacity or exponentially increasing construction costs in "the last mile" of the communication system, is the use of wireless optical telecommunications technology. Wireless optical telecommunications utilize beams of light, such as lasers, as optical communication signals, and therefore do not require the routing of cables or fibers between locations. Data, or other information, is encoded into a beam of light, and then transmitted through free space from a transmitter to a receiver.

For point-to-point free-space laser communications, the use of narrow optical beams provides several advantages, including data security, high customer density, and high directivity. High directivity makes the achievement of high data rates and high link availability easier, due to higher signal levels at a receiver. In order to take full advantage of this directivity, some form of tracking is often necessary to keep the antennas of the transmitter and of the receiver properly pointed at one another. For example, a transmitted optical beam with a 1-mrad divergence has a spot diameter at the receiver of about 1 m at a 1-km range. Also, due to the small size of high-bandwidth, high-sensitivity photodetectors, the receiver field of view is typically less than 1 mrad. Thus, movement of the transmitter or receiver by even a small fraction of the divergence (or field of view) could compromise the link unless some form of active tracking is employed.

Charge coupled device ("CCD") arrays, quadrant cell optical detectors, or lateral effects cells ("LECs") are among the devices that can detect receiver pointing errors in a tracking system, and hereinafter are referred to as tracking detectors. Note that these tracking detectors may incorporate one or more methods of internal amplification to enhance sensitivity as in avalanche photodiodes or micro-channel plate photomultipliers. In any case, an electrically controllable steering mirror, gimbal, or other steering device may be used to maximize an optical signal (e.g., light) directed at a high speed detector, based on information provided by the tracking detector. This is possible since optical paths for tracking and communication are co-aligned at the time of manufacture, and the nature of a tracking signal for a perfectly aligned signal is known. CCD tracking is very sensitive, offers potentially more immunity to solar glint than simpler detectors because of the ability to ignore glint "features" on the CCD array through image processing, and is in general, a well-proven tracking method. However, at certain communication wavelengths, a tracking beam is often necessary that is separate from the communication beam and has a different wavelength that is within the spectral sensitivity band of CCD detection systems. Such separate wavelength tracking beams, often referred to as "beacons," may be used with their own set of transmit and receive optics, thereby requiring the use of additional hardware. Furthermore, designs using separate beacon and communication optical transmitters require more time in manufacturing because of the need to co-align the two optical transmitters. Such separate transmitter paths are also more susceptible to misalignments due to mechanical shock and/or thermal stresses.

In cases where the tracking function is performed with the communication beam, a majority of the received optical signal is typically directed to the high-speed detector for the communications channel, while a small portion (e.g., 10 percent) is split off or directed to the tracking detector. For an aligned optical system using a quad cell based tracking sensor, an equal signal in all four quadrants will normally indicate that the steering mechanism has optimally directed the optical communication signal onto the high speed detector, and where there is deviation from this alignment, the steering mechanism will direct the optical signal back to this optimum equilibrium.

One method of signal detection via a tracking detector utilizes a low frequency tone superimposed on a data communication signal which can be recovered using a variety of methods in the receive electronics. An example of such a method is described in detail in commonly-assigned U.S. patent application Ser. No. 09/627,819, issued as U.S. Pat. No. 6,483,621 entitled METHOD AND APPARATUS FOR TONE TRACKING IN WIRELESS OPTICAL COMMUNICATION SYSTEMS, filed Jul. 28, 2000. This method uses a tone (e.g., 20 kHz) superimposed on a data communication signal and having a small modulation depth or occupying a distinct spectral band as compared with the primary digital or modulated data communication signal. The modulation depth of the 20 kHz tone may be as little as a few percent of the amplitude of an on-off keyed ("OOK") signal used to convey digital information, so as not to adversely impact the data communication channel sensitivity. The advantage of tone modulation detection is an enhanced sensitivity gained via use of a narrow-band electronic filter or lock-in detector that will eliminate wide-band electronic noise. In addition, tone modulation allows the tracking system to isolate a modulated tracking signal in the presence of background light that is not modulated.

A unique tracking problem arises during inclement weather conditions, such as fog or the like, in which the "line of sight" between a pair of free-space optical terminals becomes obstructed to such an extent that the communication and/or tracking signals may be lost due to the attenuation of the signal between terminals. In situations in which the inclement weather condition persists for an extended period of time, the alignment between the pair of terminals may begin to drift. This drift may ultimately lead to a misalignment of the terminals, thereby necessitating a time-consuming re-acquisition sequence following clearing of the inclement weather condition before communications between the terminals may resume, resulting in extended delays and protracted service interruptions. In some circumstances, lingering effects of the inclement weather condition, such as fog, may also hamper the re-acquisition sequence.

SUMMARY OF THE ILLUSTRATED EMBODIMENTS

An aspect of the illustrated embodiments is to provide systems and methods for implementing a high-power or high-sensitivity tracking mode of operation in a free-space optical communication system during inclement weather conditions to maintain alignment between a pair of free-space optical terminals. When an inclement weather condition interferes with the transmission of a signal between the pair of free-space optical terminals, the high-power or high-sensitivity tracking mode of operation may be enabled to alter the characteristics of the signal being transmitted or alter the configuration of the receiver to improve the performance of tracking, and thereby allow the terminals to remain aligned through the weather condition.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein:

FIG. 2A is an illustration of an example low-frequency tracking tone;

FIG. 2B is an illustration of an example digital OOK signal;

FIGS. 2C–2E are illustrations of various example digital OOK communication signals with the low-frequency tracking tone of FIG. 2A superimposed thereon in accordance with an embodiment of the present invention;

FIG. 4 is a block diagram illustrating another embodiment of communication electronics for generating and transmitting a signal in accordance with an embodiment of the present invention;

FIG. 5A is an illustration of an example digital OOK communication signal representing ordinary operating conditions in accordance with an embodiment of the present invention; and FIG. 5B is an illustration of an example high-power pulse being generated at a low-duty cycle in accordance with an embodiment of the present invention.

DETAILED DESCRIPTION OF THE ILLUSTRATED EMBODIMENTS

Embodiments of systems and methods for implementing a high-power or high-sensitivity tracking mode of operation in a free-space optical communication system are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide systems and methods for altering the characteristics of a signal being transmitted between a pair of free-space optical terminals, or altering the configuration of signal reception in response to an inclement weather condition. A variety of techniques may be utilized to alter the signal characteristics or the configuration of the receiver in order to maintain alignment between the pair of free-space optical terminals during the inclement weather condition, thereby facilitating the transmission of communications between the pair of terminals following abatement of the inclement weather condition without further delaying the interruption in service. It should be understood that the free-space optical communication system of the present invention may employ separate transmitter and receiver units, or may comprise transceiver units capable of communicating with other transceiver units, transmitter units, receiver units, or other system components. Other features of the illustrated embodiments will be apparent to the reader from the foregoing and the appended claims, and as the detailed description and discussion is read in conjunction with the accompanying drawings.

Figure 1:
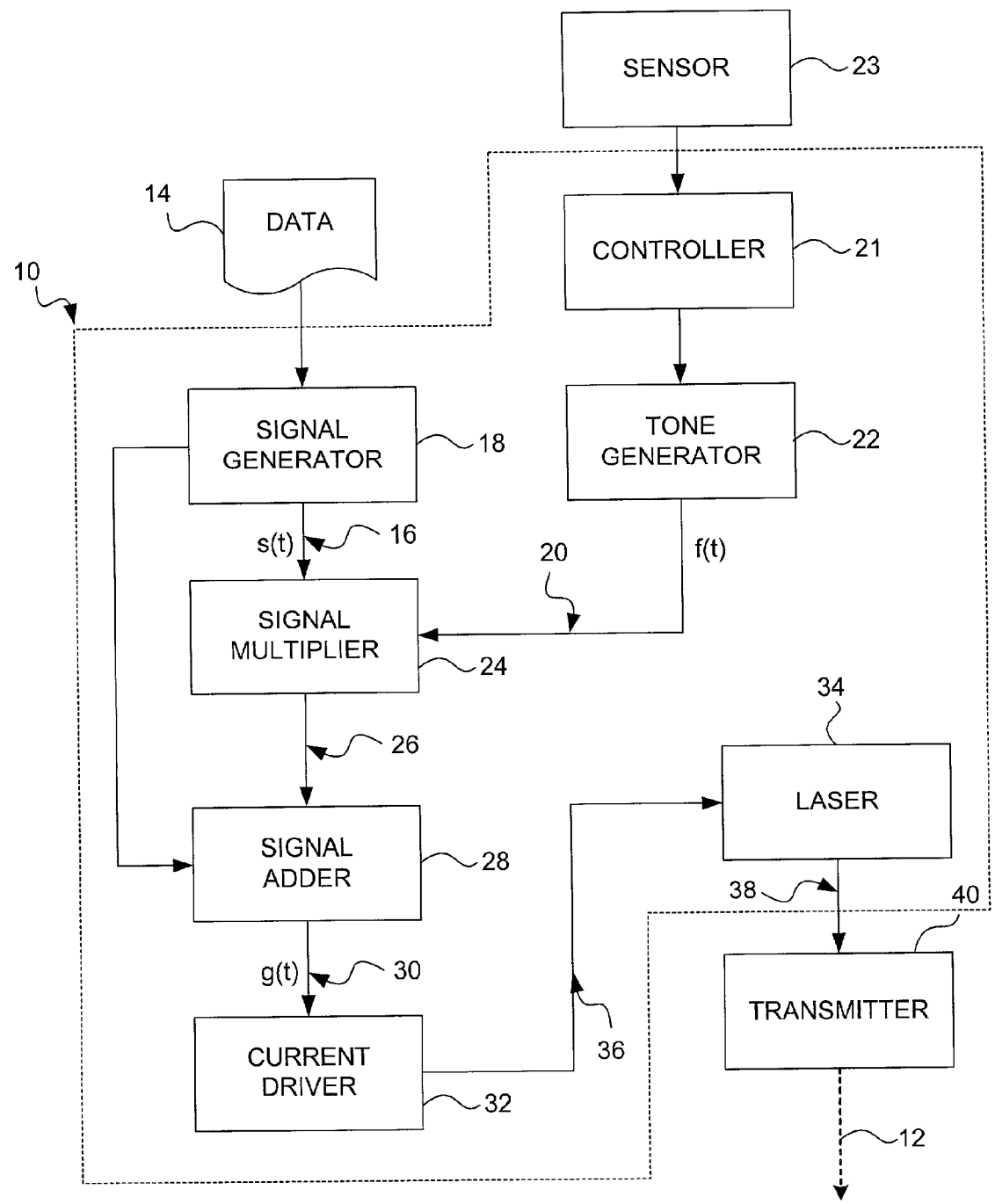
FIG. 1 is a block diagram illustrating communication electronics for generating and transmitting a signal in accordance with an embodiment of the present invention.

Referring now to the drawings, and in particular to FIG. 1, there is illustrated a block diagram of communication electronics 10 for generation and transmission of a signal in accordance with an embodiment of the present invention. Under ordinary operating conditions wherein little or no inclement weather condition exists to interfere with the transmission of data from one free-space optical terminal to another, the process of generating and transmitting an optical signal 12, implemented by the communication electronics 10, begins with the encoding of data 14 into a digital OOK signal (designated as "s(t)") 16 by an OOK signal generator 18. The digital OOK signal 16 comprises a high speed signal in an embodiment, e.g., 1.25 Gbps, and may vary within the megahertz or gigahertz range, for example. An example digital OOK signal is illustrated in FIG. 2B. It should be noted at this point that the signal illustrated in FIG. 2B, as well as other signals illustrated in the figures and discussed throughout this specification are for illustrative purposes only and are not necessarily drawn to scale, and do not necessarily show an accurate representation of a combination of multiplied or added signals. Components of the communication electronics 10 may be a part of a free-space optical terminal to varying degrees in embodiments of the invention, or may be physically separate but coupled thereto in other embodiments.

In one embodiment, the digital OOK signal 16 is combined, in a first modulator circuit, such as a signal multiplier 24, with a low-frequency (as compared to the high speed digital OOK signal 16) tracking tone (designated as "f(t)") 20 generated by tone generator 22 to produce a product signal 26. The low-frequency tracking tone 20 may vary within a frequency of 10 Hz to 100 kHz, in an embodiment. An example low-frequency tracking tone 20 is illustrated in FIG. 2A. It should be noted that although a sinusoidal signal is described and illustrated with reference to this embodiment of the present invention, other types of signals may be used, such as square waves, triangle waves, and the like, in other embodiments of the invention. In various embodiments, a variety of modulation techniques may be utilized to combine signals, including, but not limited to, amplitude modulation, frequency modulation, phase modulation, and the like.

Generation of the low-frequency tracking tone 20 by the tone generator 22 may be controlled, in an embodiment, by a controller 21. The controller 21 may vary characteristics of the low-frequency tracking tone 20, via the tone generator 22, such as frequency, amplitude, and f; the like. In one embodiment, a sensor 23 is coupled to the controller 21 to provide input to the controller 21 regarding weather conditions in proximity to the free-space optical communication system. In one embodiment, the sensor 23 may be configured to sense a physical characteristic associated with an inclement weather condition (e.g., visibility, humidity, temperature, or wind speed, which may be used to predict the presence of fog or other conditions), and may comprise a combination of sensing devices, such as a transmissometer, barometer, thermometer, and the like, to collect desired weather condition information, in an embodiment. The sensor 23 may comprise a component of a free-space optical terminal in an embodiment of the invention, or may be coupled thereto via a physical connection in other embodiments. The location of the sensor 23, configured to sense a physical characteristic of the inclement weather condition is not critical. The sensor 23 may be located near a transmitter terminal, a receiver terminal, or at some point near the path of the optical signal transmitted between the two terminals.

Figure 3:
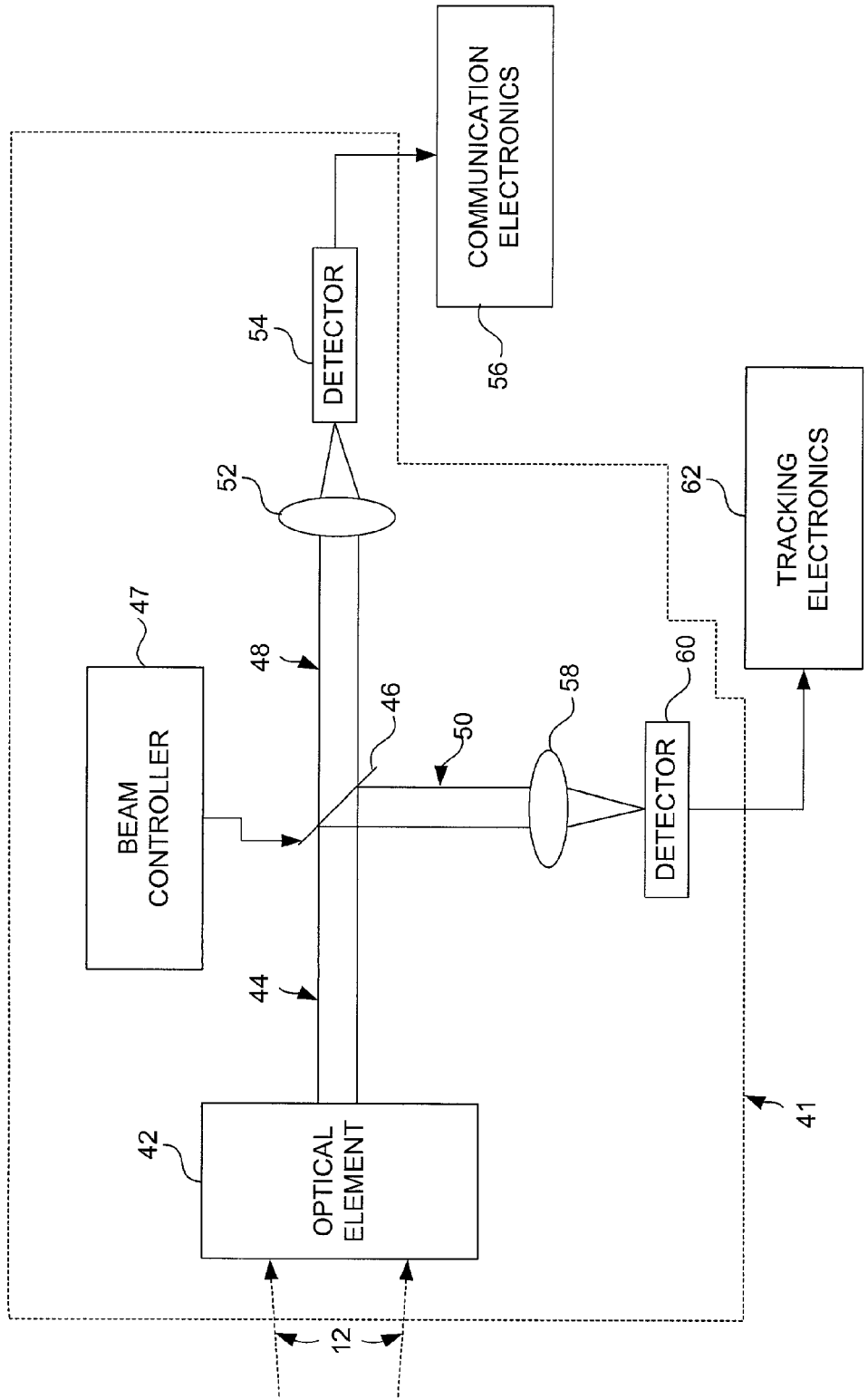
FIG. 3 is a pictorial block diagram illustrating an embodiment of a free-space optical receiver in accordance with an embodiment of the present invention.

In other embodiments, inclement weather conditions in proximity to the free-space optical communication system may be inferred from the strength of signal reception in the receiver (e.g., the receiver 41 illustrated in FIG. 3). In these cases, the sensor 23 may comprise one or more detectors located at or in proximity to the receiver terminal of the free-space optical communication system. For example, the sensor 23 may comprise a detector configured to receive at least a portion of the optical signal 12, the detector coupled to electronics, in an embodiment, configured to receive a detected signal output from the detector and compare the detected signal with a pre-defined threshold. The sensor 23, illustrated in FIG. 1, is not necessarily located in proximity to the communication electronics 10, and in various embodiments, the sensor 23 may comprise a component of the receiver 41, such as a high-speed detector 54, or a tracking detector 60 (see, e.g., FIG. 3). If the strength of the optical signal 12 being received by the detector falls below the pre-defined or preset minimum threshold, then an engage signal may be generated and transmitted to the communication electronics 10, a beam controller 47 (see, e.g., FIG. 3), the tracking electronics 62 (see, e.g., FIG. 3), or other system components, to implement a function of the high-power or high-sensitivity tracking mode of operation in order to maintain alignment between the pair of free-space optical terminals for the duration of the inclement weather condition. When the inclement weather condition diminishes to a degree, which permits communications to resume in the free-space optical communication system, then a disengage signal may be sent by the sensor 23, in an embodiment, to those system components that received the previous engage signal, so that the system may resume ordinary operation for data transmission.

The product signal 26, generated by the combination of the digital OOK signal 16 and the low-frequency tracking tone 20 in the signal multiplier 24, is input to a second modulator circuit, such as a signal adder 28, wherein the product signal 26 is combined with the digital OOK signal 16 to produce a communication signal (designated as "g(t)") 30 with the low-frequency tracking tone 20 superimposed thereon, and wherein g(t)=s(t)[1+f(t)]. Examples of communication signal 30 are illustrated in FIGS. 2C–2E with varying amplitudes of the low-frequency tracking tone 20 superimposed on the digital OOK signal 16.

In one embodiment, under ordinary operating conditions, the amplitude A of the low-frequency tracking tone 20 is within the range of 5–10 percent (or other suitable low-amplitude modulation depth) of the amplitude of the digital OOK signal 16 (see, e.g., FIG. 2C). By choosing an amplitude within the range of 5–10 percent, the tracking tone 20 has a minimal effect on the digital OOK signal 16, as contained in the communication signal 30, thereby ensuring that the receiver sensitivity, which is a measure of the fidelity of data reception at the far end of the link, is not significantly compromised in the transmission process by the incorporation of the low-frequency tracking tone 20.

In one embodiment, when an inclement weather condition is sensed either by the sensor 23 via a physical characteristic associated with the inclement weather condition, or via a defined reduction in signal strength, the engage signal may be sent by the sensor 23 to the controller 21 in the communications electronics 10 to modify the amplitude A of the low-frequency tracking tone 20. With reference primarily to FIGS. 2D and 2E, examples of the communication signal 30 are illustrated with varying amplitudes of the low-frequency tracking tone 20 superimposed thereon. FIG. 2D illustrates an embodiment wherein the amplitude A of the low-frequency tracking tone 20 represents approximately 40% of the amplitude of the digital OOK signal 16 encoded with data 14. The communication signal 30, as embodied in FIG. 2D may permit the continued transmission of data depending on the sensitivity of the receiver and/or detector receiving the communication signal 30. FIG. 2E illustrates an embodiment wherein the amplitude A of the low-frequency tracking tone 20 represents approximately 100% of the amplitude of the digital OOK signal 16 encoded with data 14. The encoded data in the communication signal 30, embodied in FIG. 2E, may be too compromised to effectively communicate data due to the likelihood of errors occurring at the receiver and/or detector. Under these circumstances, the communication electronics 10 may discontinue coding the data 14 into the high-speed signal (e.g., discontinue the high-frequency data modulation portion of the communication signal) with the signal generator 18 such that the output from signal generator 18 is a time invariant value of 0.5. The resultant communication signal 30 in this case is entirely the low-frequency tracking tone, and the retransmitted power is directed with maximum efficiency to the low-frequency tracking detector receiver electronics. In one embodiment, the high-frequency data modulation portion of the communication signal may be resumed in response to a disengage signal, as mentioned previously. In one embodiment, the communications electronics 10 may vary the amplitude A of the low-frequency tracking tone within a range of 5%–100% in response to the engage signal sent in response to a sensed inclement weather condition. By increasing the amplitude A of the low-frequency tracking tone 20, the sensitivity of the tracking detector and associated electronics, as will be discussed below, may be greatly enhanced. It will be appreciated that, in one embodiment, a tracking signal may be generated and transmitted independently from the data communication signal 30.

The communication signal 30, generated either under ordinary operating conditions, or in response to an engage signal in the high-power or high-sensitivity mode, is then input into a current driver 32 to drive a laser 34 with a modulated signal 36 in the form of the communication signal 30 to produce a modulated laser output 38. The elements in the block diagram of communication electronics 10 are for illustrating the concept of combining the data 14 and low-frequency tracking tone 20. Components of a realized system may perform multiple elements of the block diagram shown in FIG. 1. For example, using the model FMM311DG GaAs Laser Driver component manufactured by Fujitsu Semiconductor, Inc. can provide the functionality of elements 24, 28, and 32. The modulated laser output 38 may be directed through an optical fiber (not shown) to a free-space optical transmitter 40 to produce the modulated optical signal 12 representing the communication signal 30, which may include the encoded information contained in data 14. The optical signal 12 may comprise laser light in the range of 1550 nm, for example. The optical signal may also be amplified by an erbium doped fiber amplifier ("EDFA") or other type of optical amplifier prior to the free-space optical transmitter 40, in one embodiment.

The above discussion is limited to the case of direct intensity modulation of a laser transmitter by variation of the laser drive current. Other methods of imparting the modulated signal 36 to the optical signal 12 include, but are not limited to, polarization modulation by an electro-optic modulator, wavelength modulation by a wavelength-tunable laser, phase modulation by an electro-optic modulator and external intensity modulation of a continuous-wave laser using an electro-optic Mach-Zehnder interferometer. These alternative modulation methods may require adaptation of the receiver components to be compatible with the modulated optical signal. For example, phase modulation of the optical signal will typically require a heterodyne or homodyne type of optical receiver for detection. The receiver discussed in the following assumes that the optical signal 12 is modulated in intensity only, consistent with the above discussion. However, the generality of the receiver to include other methods of optical modulation is within the scope of the present invention.

The operation of receiving components in accordance with embodiments of the present invention may be understood upon reference primarily to FIG. 3, which illustrates an embodiment of a free-space optical receiver 41 utilizing a pair of detectors for detecting the optical signal 12 transmitted from a corresponding free-space optical transmitter, as described previously with reference to FIG. 1. Components of the receiver 41 may be embodied in a free-space optical terminal to varying degrees in embodiments of the invention, or may be coupled thereto in other embodiments. The optical signal 12 is received by an optical element 42, which may comprise a typical arrangement of lenses and mirrors designed to collect and focus light to a single receiving point as will be apparent to one skilled in the art. In one embodiment, the optical element 42 includes a holographic optical element as described in commonly-assigned U.S. patent application Ser. No. 09/627,815, issued as U.S. Pat. No. 6,608,708 entitled SYSTEM AND METHOD FOR USING A HOLOGRAPHIC OPTICAL ELEMENT IN A WIRELESS TELECOMMUNICATION SYSTEM RECEIVER, filed Jul. 28, 2000, and incorporated herein by reference.

The optical signal 12 is collected and transformed by the optical element 42 to produce either a collimated or converging optical signal 44, which is directed to a beam splitter 46 that splits the collimated or converging optical signal 44 into a first optical signal 48, which may comprise a high-speed data component in an embodiment, and a second optical signal 50, which may comprise a tracking signal component in an embodiment. FIG. 3 illustrates the case where the collimated or converging optical signal 44 is collimated, however, one skilled in the art will readily adjust to the case of this beam being converging instead. The beam splitter 46 may comprise a variable wave plate, a graduated reflective mirror (e.g., allowing approximately 100% transmission at one extreme, and approximately 100% reflection at the opposite extreme), a polarizing beam splitter, or other suitable device to provide a capability for modifying an optical split ratio (e.g., the ratio of the first optical signal 48 to the second optical signal 50) between communication and tracking receive paths. Modification of the optical split ratio between communication and tracking receive paths may be facilitated, in an embodiment, by adjustment of the beam splitter 46 with a beam controller 47.

The first optical signal 48 comprises approximately 90% of the collimated or converging optical signal 44 in an embodiment under ordinary operating conditions. The first optical signal 48 is directed, via a primary focusing lens 52 (which may be eliminated in cases where the collimated or converging optical signal 44 is converging), to a high-speed detector 54 configured to detect the first optical signal 48, and to generate an electrical signal corresponding 15: to the recovered communication signal 30, which is then input into communication electronics 56 for processing and recovery of data 14. The high-speed detector 54 may be a typical InGaAs (indium-gallium-arsenic) detector, avalanche photodiode, PIN detector, or other detector suitable for the particular data speeds involved in a particular application. The processing of the signal detected by the high-speed detector 54 is beyond the scope of this disclosure, and will not be discussed in greater detail herein.

The second optical signal 50 comprises approximately 10% of the collimated or converging optical signal 44 in an embodiment under ordinary operating conditions, but can vary with the percentage directed to the first optical signal 48 as discussed above. The second optical signal 50 is directed, via a secondary focusing lens 58 (which may be eliminated in cases where the collimated or converging optical signal 44 is converging), to a tracking detector 60, which may comprise a quad cell detector in an embodiment, or other detector that generates electrical outputs that are then input to tracking electronics 62, described in greater detail hereinbelow. Although a quad cell detector will be described as the tracking detector in conjunction with the illustrated embodiments, other detectors, including single-cell detectors, or multiple-cell detectors having a plurality of cells (e.g., 6 or 8 cells), may also be utilized in other embodiments of the invention. A typical advantage of using the quad cell detector 60 is an increased field of view for detecting the optical signal 12 transmitted by the free-space optical transmitter 40 (see, e.g., FIG. 1). This wider field of view is due to the typically larger (in comparison to the high-speed detector 54) diameter of the quad cell detector 60, and provides an advantage useful for implementation of the illustrated embodiments. In the event that the pair of free-space terminals, between which the optical signal 12 is being transmitted, is not aligned well enough for the high-speed detector 54 to function, the wide field of view of the quad cell detector 60 may permit the transmission of auxiliary communications, which may include coordinated acquisition and tracking algorithms, or other system information that allows the system to function more effectively under the particular circumstances. Apparatus and methods of conveying auxiliary information between free-space optical terminals are disclosed in commonly-assigned U.S. patent application Ser. No. 09/859,339, entitled TONE MODULATION FOR OUT-OF-BAND COMMUNICATION IN A FREE-SPACE OPTICAL COMMUNICATION LINK, filed May 16, 2001, and incorporated herein by reference.

In response to a sensed inclement weather condition, such as fog or the like, a second engage signal may be sent to the beam controller 47 to modify the optical split ratio between the communication and receive paths to increase the percentage of the collimated optical signal 44 being directed to the tracking detector 60. This function of the high-power or high-sensitivity tracking mode of operation may be utilized in combination with other functions of the high-power or high-sensitivity tracking mode, such as increasing the amplitude A of the low-frequency tracking tone 20, to further increase the sensitivity of the tracking components of the free-space optical communication system.

Each of four electrical outputs from the respective quadrants of the quad cell detector 60 are input into tracking electronics 62 and individually directed to a low-pass filter/amplifier, in an embodiment, to filter the electrical outputs within a relatively narrow tracking signal bandwidth to produce a cell signal for each respective quadrant of the quad cell detector 60. Each cell signal provides an indication of the strength of the optical signal incident on that quadrant of the quad cell detector 60, which in turn provides an indication of the alignment between the transmitting terminal and the receiving terminal of the free-space optical communication system. Optimally, the optical signal will be centered on the quad cell detector 60 such that each respective quadrant of the quad cell receives an identical portion of the incident light (e.g., the second optical signal 50), and consequently produces an identical cell signal. The tracking electronics compare the four cell signals generated by the four respective quadrants of the quad cell detector 60, and provide relevant information to a steering mechanism (not shown) that can adjust the tracking and alignment of the terminals to provide a better communication channel for data transmission.

In one embodiment in accordance with the teachings of the present invention, the tracking electronics 62 may be designed to decrease the tracking signal bandwidth, and narrowly filter the frequency corresponding to the low-frequency tracking tone 20 by multiplying the signal(s) generated by each cell of the tracking detector 60 with a local oscillator having the same frequency as the low-frequency tracking tone 20 generated by the tone generator 22. The tracking electronics 62 may be configured to adjust the sensitivity of this tracking feature (bandwidth of the filter) in response to receiving an engage signal generated and sent from a sensor or other component in response to a sensed inclement weather condition. Since communication of data is not of primary concern during the inclement weather condition wherein high-power or high-sensitivity tracking mode has been implemented, there is no need for the tracking electronics 62 to compensate for high-frequency vibrations. Instead, the tracking electronics 62 need only compensate for slow thermal drift effects, and consequently, averaging times on the scale of tens of minutes may be acceptable. Sensitivity of the tracking electronics 62 may be further increased by utilizing a gated camera (not shown) as the tracking detector 60, in an embodiment. By being turned "ON" only when a signal is available, noise can be reduced, and the sensitivity of the tracking increased.

With reference now primarily to FIG. 4, another embodiment of communication electronics 64 is illustrated, showing a sensor 66, coupled to a controller 68, in turn coupled to a signal generator 70 that generates a signal 72 that drives a pulse laser 74, in an embodiment, to produce a pulsed laser output 76. The pulsed laser output 76 may then be input into an EDFA 78, in an embodiment, which feeds a transmitter 80 to transmit an optical signal 82 having a pulse stream with a maximum time-averaged amplified power less than the average amplified power of the EDFA. The components of the communication electronics 64 may be substituted for, or used in conjunction with, the components of the communication electronics illustrated in FIG. 1. Other suitable light sources may be utilized in other embodiments of the invention in place of the pulsed laser to generate the pulsed drive signals to create a pulsed waveform consistent with this function of the high-power or high-sensitivity tracking mode of operation.

Free-space optical communication systems, such as those described generally herein in conjunction with the principles of the present invention, are constrained in regard to a maximum amount of power that may be transmitted over a finite period of time. These constraints may be embodied in the form of eye-safety standards promulgated by federal, state or local regulatory agencies or other organizations. In general, eye-safety standards and maximum permissible exposures associated with those standards, are scaled based on an individual's exposure time. For example, with wavelengths longer than 1400 nm, if the maximum permissible exposure is based on an exposure duration of 10 seconds, then by transmitting only short bursts equaling a total of 0.1 seconds in every 10 seconds, approximately 100 times as much peak power can be transmitted within the permissible maximum exposure standards.

In consideration of the foregoing, an additional function of the high-power or high-sensitivity tracking mode of operation comprises replacing the communication signal 30, transmitted under ordinary operation conditions, with a high-power pulse at a low-duty cycle.

The high-power pulses are more readily detected in inclement weather conditions. For example, FIG. 5A is an illustration of a typical OOK communication signal including encoded data, which may be generated and transmitted by communication electronics 10 (see, e.g., FIG. 1) under ordinary operating conditions. FIG. 5B illustrates a function of the high-power or high-sensitivity tracking mode in accordance with an embodiment of the present invention wherein the typical OOK communication signal has been replaced by high-power pulses generated and transmitted by communication electronics 64 at a low-duty cycle such that the power transmitted during each successive time period $t_1$ falls within any applicable eye-safety standards as discussed generally above. Although a rectangular waveform is illustrated in FIG. 5B with regard to the high-power pulse, the pulse may be any waveform (e.g., triangular, sinusoidal, or the like) transmitted for a finite time, such as the low-frequency tracking tone 20 (see, e.g., FIG. 1). Assuming the low-frequency tracking tone is being transmitted as a pulse at regular intervals for a duration of 0.1 seconds, as discussed above, the tracking electronics 62 (see, e.g., FIG. 3) may be configured, in an embodiment, to selectively focus on either the frequency of the tracking tone 20 (e.g., 20 kHz), or on the waveform created by the pulses (e.g., 0.1 Hz) to facilitate maintenance of the alignment between the pair of free-space optical terminals.

Functions of the high-power or high-sensitivity tracking mode of operation discussed above may be utilized in combination with one another, or separately, to achieve the desired sensitivity of the tracking components of the free-space optical communication system and maintain the alignment of the pair of free-space optical terminals throughout the duration of the inclement weather condition that triggered implementation of one or more functions of the high-power or high-sensitivity tracking mode.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
    generating a communication signal;
    transmitting the communication signal in a free-space optical communication system along an optical signal path from a first free-space optical terminal to a second free-space optical terminal, the second free-space optical terminal including a receiver to receive an optical signal;
    sensing a weather condition in proximity to the optical signal path;
    sending at least one engage signal to a system component to implement a tracking mode in response to the sensed weather condition;
    altering the communication signal in response to the at least one engage signal
    altering a configuration of a receiver component in response to the at least one engage signal, wherein altering the configuration of the receiver component includes modifying an optical split ratio between communication and tracking receive paths to increase a percentage of the optical signal to be directed to a tracking detector.

2. The method of claim 1, wherein the communication signal comprises a high-frequency data signal with a low-frequency tracking tone superimposed thereon, the low-frequency tracking tone having an amplitude, and wherein altering the communication signal comprises increasing the amplitude of the low-frequency tracking tone.

3. The method of claim 1, wherein altering the communication signal comprises replacing the communication signal with high-power pulses at a low-duty cycle.

4. The method of claim 1, wherein altering the configuration of the receiver component comprises decreasing a tracking signal bandwidth.

5. The method of claim 1, wherein sensing the weather condition comprises identifying a reduction in signal strength, at the receiver, below a pre-defined threshold.

6. The method of claim 1, wherein sensing the weather condition comprises measuring at least one physical characteristic associated with the weather condition.

7. A free-space optical communication system, comprising:
    a first free-space optical terminal coupled to communication electronics to generate a communication signal, the first free-space optical terminal including a transmitter configured to transmit an optical signal;
    a second free-space optical terminal, including a receiver to receive the optical signal, the receiver being coupled to tracking electronics to process a tracking signal, wherein the receiver includes a beam splitter, coupled to a beam controller, to split the optical signal between a communication receive path and a tracking receive path, and wherein an optical split ratio defines a percentage of the optical signal to be directed along either receive path; and
    a sensor to sense a weather condition in proximity to an optical signal path, the sensor coupled to the communication electronics; and wherein
    in response to a weather condition sensed in proximity to the optical signal path, the sensor is configured to send a first engage signal to the communication electronics, and the communication electronics is configured to alter the communication signal in response to the first engage signal; and wherein
    in response to a weather condition sensed in proximity to the optical signal path, the sensor is further configured to send a second engage signal to the beam controller to modify the optical split ratio to increase the percentage of the optical signal to be directed along the tracking receive path.

8. The system of claim 7, wherein the communication signal comprises a high-frequency data signal with a low-frequency tracking tone superimposed thereon, the low-frequency tracking tone having an amplitude, and wherein the communication electronics is configured to alter the communication signal by increasing the amplitude of the low-frequency tracking tone.

9. The system of claim 8, wherein the communication electronics are further configured to alter the communication signal by disabling a high-frequency data modulation portion of the communication signal.

10. The system of claim 7, wherein the communication electronics is configured to alter the communication signal by replacing the communication signal with high-power pulses at a low-duty cycle.

11. The system of claim 7, wherein the tracking electronics include a filter to select a tracking signal bandwidth, and wherein
    in response to a weather condition sensed in proximity to the optical signal path, the sensor is further configured to send a second engage signal to the tracking electronics to decrease the tracking signal bandwidth.

12. The system of claim 7, wherein the beam splitter comprises a variable wave plate.

13. The system of claim 7, wherein the beam splitter comprises a graduated reflective mirror.

14. The system of claim 7, wherein the beam splitter comprises a polarizing beam splitter.

15. The system of claim 7, wherein the sensor comprises a detector to receive at least a portion of the optical signal, the detector coupled to electronics configured to receive a detected signal from the detector and to compare the detected signal with a pre-defined threshold, and wherein sensing the weather condition comprises identifying a reduction in the detected signal below the pre-defined threshold.

16. The system of claim 7, wherein the sensor comprises an apparatus capable of measuring at least one physical characteristic associated with the weather condition, and wherein sensing the weather condition comprises measuring the at least one physical characteristic and identifying the weather condition therefrom.

17. A free-space optical terminal, comprising:

a signal generator to generate a high-speed signal;

a tone generator to generate a low-frequency tracking tone having an amplitude, the tone generator coupled to a controller;

a first modulator circuit, coupled to the signal generator and the tone generator, to combine the high-speed signal with the low-frequency tracking tone to produce a product signal;

a second modulator circuit, coupled to the first modulator circuit, to combine the product signal with the high-speed signal to produce a communication signal; and a transmitter to transmit the communication signal as an optical signal to a second free-space optical terminal capable of receiving the optical signal; and wherein the controller is coupled to a sensor configured to sense a weather condition, and to generate and send an engage signal to the controller in response to the sensed weather condition, and wherein the controller is configured to increase the amplitude of the low-frequency tracking tone in response to the engage signal, wherein the controller is further configured to disable a high-frequency data modulation portion of the communication signal in response to the engage signal, wherein the sensor is further configured to generate and send a disengage signal to the controller in response to an abatement of the weather condition, and the controller is further configured to resume the high-frequency data modulation portion of the communication signal in response to the disengage signal.

18. The free-space optical terminal of claim 17, wherein the sensor is further configured to generate and send a disengage signal to the controller in response to an abatement of the weather condition, and the controller is further configured to decrease the amplitude of the low-frequency tracking tone in response to the disengage signal.

19. The free-space optical terminal of claim 17, wherein the sensor comprises a detector to receive at least a portion of the optical signal, the detector being coupled to electronics configured to receive a detected signal from the detector and to compare the detected signal with a pre-defined threshold, and wherein sensing the weather condition comprises identifying a reduction in the detected signal below the pre-defined threshold.

20. The free-space optical terminal of claim 17, wherein the sensor comprises an apparatus capable of measuring at least one physical characteristic associated with the weather condition, and wherein sensing the weather condition comprises measuring the at least one physical characteristic and identifying the weather condition therefrom.

21. A free-space optical terminal, comprising:

a signal generator to generate a data signal, the signal generator coupled to a controller;

a light source, coupled to the signal generator, to produce an output from the data signal;

an amplifier, coupled to the light source, to communicate the output to a transmitter to transmit the signal as an optical signal to a second free-space optical terminal configured to receive the optical signal; and wherein the controller is coupled to a sensor configured to sense a weather condition, and to generate and send an engage signal to the controller in response to the sensed weather condition, and wherein the controller is configured to replace the data signal with high-power pulses at a low-duty cycle in response to the engage signal, wherein the sensor is further configured to generate and send a disengage signal to the controller in response to an abatement of the sensed weather condition, and the controller is further configured to replace the high-power pulses at a low-duty cycle with the data signal in response to the disengage signal.

22. The free-space optical terminal of claim 21, wherein the sensor comprises a detector to receive at least a portion of the optical signal, the detector being coupled to electronics configured to receive a detected signal from the detector and to compare the detected signal with a pre-defined threshold, and wherein sensing the weather condition comprises identifying a reduction in the detected signal below the pre-defined threshold.

23. The free-space optical terminal of claim 21, wherein the sensor comprises an apparatus capable of measuring at least one physical characteristic associated with the weather condition, and wherein sensing the weather condition comprises measuring the at least one physical characteristic and identifying the weather condition therefrom.

24. A free-space optical terminal, comprising:

an optical element to receive a signal transmitted through free-space, and to produce an optical signal therefrom;

a beam splitter positioned to split the optical signal between a communication receive path and a tracking receive path, wherein an optical split ratio defines a percentage of the optical signal to be directed along either receive path, the beam splitter coupled to a beam controller;

a detector to receive a data signal component of the optical signal; and a tracking detector to receive a tracking signal component of the optical signal; and wherein the beam controller is coupled to a sensor configured to sense a weather condition, and to generate and send an engage signal to the beam controller in response to the sensed weather condition, and wherein the beam controller is configured to modify the optical split ratio to increase the percentage of the optical signal to be directed along the tracking receive path in response to the engage signal.

25. The free-space optical terminal of claim 24, wherein the sensor is further configured to generate and send a disengage signal to the beam controller in response to an abatement of the weather condition, and the beam controller is further configured to modify the optical split ratio to decrease the percentage of the optical signal to be directed along the tracking receive path in response to the disengage signal.

26. The free-space optical terminal of claim 24, wherein the sensor comprises the tracking detector, the tracking detector coupled to electronics configured to receive a detected signal from the tracking detector and to compare the detected signal with a pre-defined threshold, and wherein sensing the weather condition comprises identifying a reduction in the detected signal below the pre-defined threshold.

27. The free-space optical terminal of claim 24, wherein the sensor comprises the detector, the detector being coupled to electronics configured to receive a detected signal from the detector and to compare the detected signal with a pre-defined threshold, and wherein sensing the weather condition comprises identifying a reduction in the detected signal below the pre-defined threshold.

28. The free-space optical terminal of claim 24, wherein the sensor comprises an apparatus capable of measuring at least one physical characteristic associated with the weather condition, and wherein sensing the weather condition comprises measuring the at least one physical characteristic and identifying the weather condition therefrom.

29. The free-space optical terminal of claim 24, wherein the beam splitter comprises a variable wave plate.

30. The free-space optical terminal of claim 24, wherein the beam splitter comprises a graduated reflective mirror.

31. The free-space optical terminal of claim 24, wherein the beam splitter comprises a polarizing beam splitter.

32. A free-space optical terminal, comprising:
a signal generator to generate a high-speed signal;
a tone generator to generate a tracking tone having an amplitude, the tone generator coupled to a controller;
a first modulator circuit, coupled to the signal generator and the tone generator, to combine the high-speed signal with the tracking tone to produce a product signal;
a second modulator circuit, coupled to the first modulator circuit, to combine the product signal with the high-speed signal to produce a communication signal; and
a transmitter to transmit the communication signal as an optical signal to a second free-space optical terminal capable of receiving the optical signal; and wherein
the controller is coupled to a sensor configured to sense changes in the optical signal and to generate and send an engage signal to the controller in response to an adverse change in the optical signal, wherein the controller is configured to increase the amplitude of the tracking tone in response to the engage signal; and wherein
the controller is further configured to disable a high-frequency data modulation portion of the communication signal in response to the engage signal; and wherein
the sensor is further configured to generate and send a disengage signal to the controller in response to an abatement of the adverse change, and the controller is further configured to resume the high-frequency data modulation portion of the communication signal in response to the disengage signal.

33. The free-space optical terminal of claim 32 wherein the sensor is further configured to generate and send a disengage signal to the controller in response to an abatement of the adverse change, and the controller is further configured to decrease the amplitude of the tracking tone in response to the disengage signal.

34. The free-space optical terminal of claim 32 wherein the sensor comprises a detector to receive at least a portion of the optical signal, the detector being coupled to electronics configured to receive a detected signal from the detector and to compare the detected signal with a pre-defined threshold, and wherein sensing the adverse change comprises identifying a reduction in the detected signal below the pre-defined threshold.

* * * * *